United States Patent
Quintieri

(10) Patent No.: US 9,543,595 B2
(45) Date of Patent: Jan. 10, 2017

(54) SEPARATOR PLATE WITH INTERMEDIATE INJECTION OF GAS, FUEL CELL, METHOD OF FEEDING A FUEL CELL

(75) Inventor: Christian Quintieri, Aix en Provence (FR)

(73) Assignee: AREVA STOCKAGE D'ENERGIE, Aix en Provence (FR)

( * ) Notice: Subject to any disclaimer, the term of this patent is extended or adjusted under 35 U.S.C. 154(b) by 291 days.

(21) Appl. No.: 14/130,704

(22) PCT Filed: Jul. 6, 2012

(86) PCT No.: PCT/EP2012/063291
§ 371 (c)(1),
(2), (4) Date: Feb. 6, 2014

(87) PCT Pub. No.: WO2013/004822
PCT Pub. Date: Jan. 10, 2013

(65) Prior Publication Data
US 2014/0147763 A1 May 29, 2014

(30) Foreign Application Priority Data
Jul. 6, 2011 (FR) ...................... 11 56110

(51) Int. Cl.
| H01M 8/02 | (2016.01) |
|---|---|
| H01M 8/04 | (2016.01) |
| H01M 8/10 | (2016.01) |
| H01M 8/12 | (2016.01) |

(52) U.S. Cl.
CPC ........... *H01M 8/026* (2013.01); *H01M 8/0258* (2013.01); *H01M 8/0267* (2013.01); *H01M 8/04156* (2013.01); *H01M 8/04007* (2013.01); *H01M 2008/1095* (2013.01);
(Continued)

(58) Field of Classification Search
CPC .. H01M 8/0258; H01M 8/026; H01M 8/0267; H01M 8/04007; H01M 8/04156; H01M 2008/1095; H01M 2008/1293; Y02E 60/50; Y02E 60/525
See application file for complete search history.

(56) References Cited

U.S. PATENT DOCUMENTS

| 2002/0187383 A1 | 12/2002 | Katagiri et al. |
| 2007/0099063 A1 | 5/2007 | Yoshizawa et al. |
| 2009/0239120 A1* | 9/2009 | Moteki ............... H01M 8/0247 |
| | | 429/492 |

FOREIGN PATENT DOCUMENTS

| FR | 2 847 722 A1 | 5/2004 |
| JP | 10-284095 | * 10/1998 |
| JP | 10 284095 A | 10/1998 |

OTHER PUBLICATIONS

English translation of JP Publication 10-284095.*

* cited by examiner

*Primary Examiner* — Brittany Raymond
(74) *Attorney, Agent, or Firm* — Davidson, Davidson & Kappel, LLC

(57) ABSTRACT

A fuel cell separator plate is provided. The fuel cell separator plate includes at least one groove formed in a face of the separator plate so as to feed reactant gas to a membrane electrode assembly applied against the face of the separator plate, the groove comprising an inlet section and an outlet section. The fuel cell separator plate also includes injection means configured so as to inject gas into at least one intermediate section of the groove, situated between the inlet section and the outlet section.

8 Claims, 2 Drawing Sheets

(52) U.S. Cl.
CPC ...... *H01M 2008/1293* (2013.01); *Y02E 60/50* (2013.01); *Y02E 60/525* (2013.01)

SEPARATOR PLATE WITH INTERMEDIATE INJECTION OF GAS, FUEL CELL, METHOD OF FEEDING A FUEL CELL

The present invention relates to the field of ion exchange membrane fuel cell.

BACKGROUND

An ion exchange membrane fuel cell comprises a stack of elementary electrochemical cells. Each electrochemical cell comprises a membrane electrode assembly ("MEA") sandwiched between two separator plates.

The membrane electrode assembly is laminated and comprises an ion exchange membrane sandwiched between two electrodes. Each electrode comprises an active layer adjacent to the membrane and a gas diffusion layer. One electrode makes up the anode and the other makes up the cathode.

Each separator plate comprises grooves provided in its face which is pressed tight against the membrane electrode assembly in a manner so as to define between the separator plate and the membrane electrode assembly conduits for the circulation of a reactant gas in contact with the membrane electrode assembly.

During operation of the fuel cell, fuel feeds the grooves of the anode side plate and oxidising gas feeds the grooves of the cathode side plate. The fuel supplies the anode side with electrons and ions. The electrons are captured by the anode. The ions pass through the membrane and combine with the electrons supplied by the cathode and the oxidising gas into at least one resulting product.

The fuel cell is for example of the PEMFC type ("Proton Exchange Membrane Fuel Cell"). The ion exchange membrane is thus a proton exchange membrane. When in operation, the grooves of the anode side separator plate are supplied with hydrogen and the grooves of the cathode side separator plate are supplied with air or oxygen. The hydrogen produces protons which pass through the membrane and electrons that are captured by the anode. The protons are combined on the cathode side with the electrons supplied by the cathode and the oxygen to produce water.

Therefore the operation of the fuel cell results in the production of water that is likely to disrupt the flow of the reactant gas in the grooves, in particular by creating clogging. The disrupted supply is likely to diminish the performance of the fuel cell.

SUMMARY OF THE INVENTION

One object of the invention is therefore to provide a separator plate that offers the ability to ensure a satisfactory distribution of reactant gas over a membrane electrode assembly.

To achieve this end, the invention provides a fuel cell separator plate, comprising at least one groove formed in a face of the separator plate in order to supply reactant gas to a membrane electrode assembly applied against the face of the separator plate, the groove comprising an inlet section and an outlet section, and injection means configured so as to inject gas into at least one intermediate section of the groove situated between the inlet section and the outlet section.

According to other embodiments, the separator plate comprises one or more of the following characteristic features, considered individually or according to any technically possible combination:

the injection means are configured so as to inject the reactant gas, the injection means are supplied with reactant gas in a reactant gas supply orifice wherein the inlet section of the groove is fed, the injection means comprise at least one injection conduit extending through the separator plate, the injection conduit being supplied with reactant gas and opening into the intermediate section through an injection port, the injection conduit extends into the thickness of the separator plate, the injection conduit is delimited between two stacked elementary plates forming the separator plate, the injection conduit extends by branching off from the groove between a reactant gas supply orifice in which the inlet section of the groove is supplied, and at least one injection port, comprising cooling conduits extending in the interior of the separator plate, the separator plate is monopolar or bipolar.

The invention also relates to a fuel cell comprising separator plates and membrane electrode assemblies stacked in alternation, including at least one separator plate as defined above.

The invention further relates to a method for feeding a fuel cell, in which a groove formed in one face of a separator plate is fed with the reactant gas in order to ensure the circulation of the reactant gas in contact with a membrane electrode applied against the face of the separator plate from an inlet section of the groove, wherein additional gas is injected into an intermediate section of the groove, situated between the inlet section and an outlet section.

BRIEF SUMMARY OF THE DRAWINGS

The invention and its advantages will be better understood upon reviewing the description which follows, provided solely by way of example and with reference being made to the accompanying drawings, in which.

DETAILED DESCRIPTION

Figure 1:
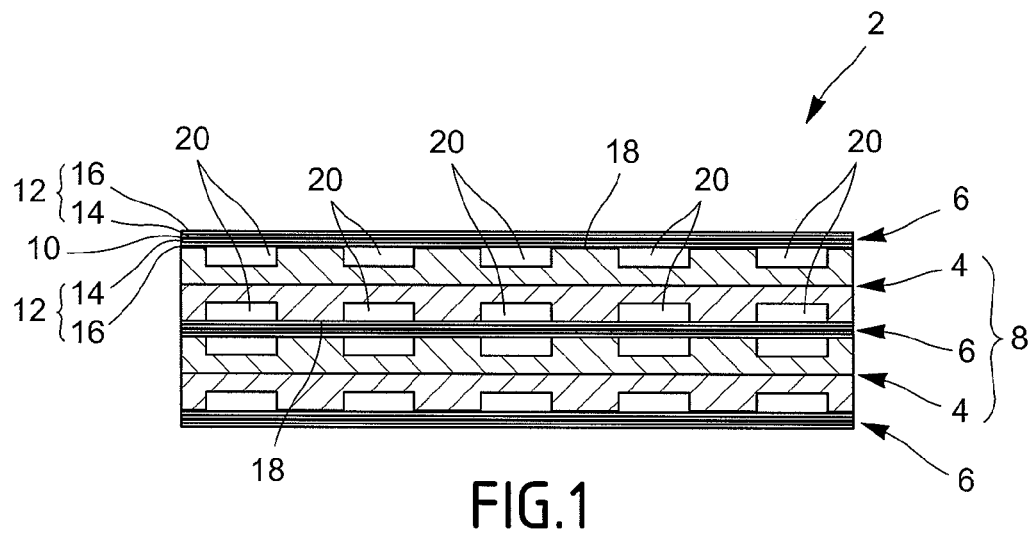
FIG. 1 is a schematic sectional view of a fuel cell.

With reference to FIG. 1, the fuel cell 2 comprises a stack of separator plates 4 and membrane electrode assemblies 6 arranged in alternation. The universally accepted term "stack" is commonly used to refer to a stack as such.

Each membrane electrode assembly 6 is sandwiched between two separator plates 4. Each assembly formed of two separator plates 4 disposed on both sides of a membrane electrode assembly 6 defines an elementary electrochemical cell 8 of the fuel cell 2.

Each membrane electrode assembly 6 is in the form of a plate and is laminated. Each membrane electrode assembly 6 comprises an ion exchange membrane 10 and two electrodes 12 disposed on both sides of the membrane 10.

The membrane 10 is in particular a proton exchange membrane, and the fuel cell PEM type ("Proton Exchange Membrane").

Each electrode 12 is electrically conductive. Each electrode 12 includes an active layer 14 and a gas diffusion layer 16. One electrode 12 defines an anode and the other a cathode.

The separator plates 6 provide for the function of electrical conduction. The separator plates 6 are electrically conductive and in electrical contact with the electrodes 12.

The separator plates 6 provide for the function of distribution of reactant gases on both sides of the membrane electrode assembly 6 and of discharging of the resultant products.

The separator plates 4 illustrated in FIG. 1 are "bipolar": each separator plate 4 is arranged between two membrane electrode assemblies 6 and in contact by means of each of its opposite faces 18 with a membrane electrode assembly 6 and comprises grooves on each of its two opposite faces. A separator plate is referred to as "monopolar" when it possesses one single face in contact with a membrane electrode assembly. Such monopolar separator plates (not shown) are found at the ends of the stack of the fuel cell 2.

Each separator plate 4 is in contact by means of one of its faces 18 with an anode forming electrode 12 of a membrane electrode assembly 6 and in contact by means of the other of its faces 18 with a cathode forming electrode 12 of the other membrane electrode assembly 6.

Each separator plate 4 comprises at least one groove 20 formed on each of its faces 18 in order to define with an adjacent membrane electrode assembly 6 the supply conduits for the circulation of reactant gas in contact with the membrane electrode assembly 6.

The grooves 20 of the faces 18 of each separator plate 4 are supplied separately with different reactant gases. The grooves 20 of the face 18 in contact with an anode forming electrode 12 are supplied with fuel, for example hydrogen, and the grooves 20 of the other face 18 in contact with a cathode forming electrode 12 are supplied with the oxidising-combustion agent, for example oxygen or air.

The grooves 20 of the faces 18 of the separator plates 4 in contact with the anode forming electrodes 12 define an anode compartment and are fluidly connected to each other. The grooves 20 of the faces 18 of the separator plates 4 in contact with the cathode forming electrodes 12 define a cathode compartment and are fluidly connected to each other.

Each separator plate 4 comprises means for supplying the or each groove 20 with reactant gas, and for the discharge of reactant gases that are unconsumed and the products resulting from the functioning of the fuel cell.

The separator plates 4 are analogous. A separator plate 4 and its means of reactant gas supply will now be described in more detail with reference being made to FIGS. 2 and 3.

Figure 2:
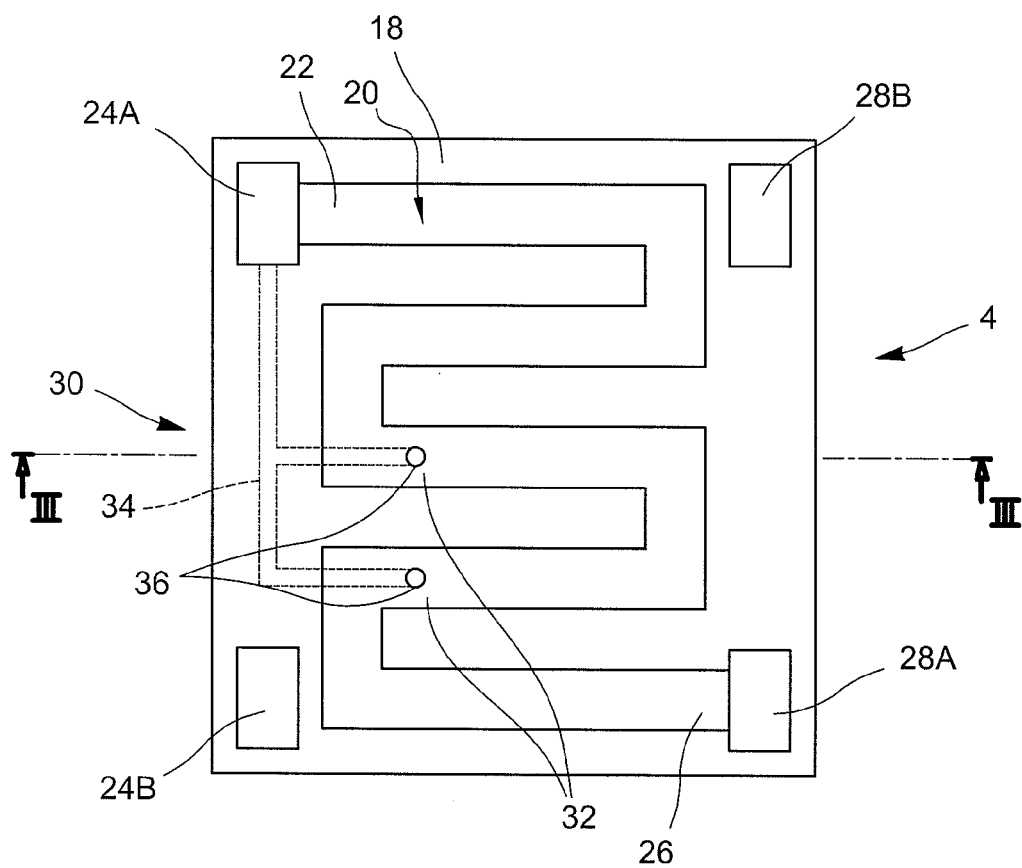
FIGS. 2 and 3 are views of a separator plate of the fuel cell, presented respectively from above and in section along III-III in FIG. 2.

As illustrated in FIG. 2, the separator plate 4 comprises on its face 18 visible in FIG. 2 one groove 20 comprising an inlet section 22 being supplied with reactant gas in a supply orifice 24A and an outlet section 26 opening into a discharge orifice 28A.

The groove 20 allows the flow of the reactant gas along the membrane electrode assembly 22 of the inlet section to the outlet section 26.

The groove 20 extends between its inlet section 22 and its outlet section 26 along a serpentine path, here a boustrophedon path.

The supply orifice 24A traverses through the separator plate 4. When several separator plates 4 are stacked, the supply orifices 24A are aligned in a manner so as to define a supply manifold extending through the stack of the fuel cell.

The discharge orifice 28A traverses through the plate separator 4. When several separator plates 4 are stacked, the discharge orifices 28A are aligned in a manner so as to define a discharge manifold.

The separator plate 4 includes another supply orifice 24B and one discharge orifice 28B which are not fluidly connected to the groove 20 of the visible face 18 but to a groove of the opposite non-visible face in FIG. 2.

When in operation, one of the supply orifices 24A, 24B is supplied with fuel, and the other with oxidising agent.

The supply means further comprises injection means 30 for injection of additional reactant gas in at least one intermediate section 32 of the groove 20, located along the groove 20 between the inlet section 22 and the outlet section 26. The injection means 30 here enable the injection of additional reactant gas in two intermediate sections 32.

The injection means 30 comprise of an injection conduit 34 being supplied with reactant gas in the supply orifice 24A in which the inlet section 22 of the groove 20 is fed and opening into each intermediate section 32 by way of an injection port 36.

The injection conduit 34 extends between the supply orifice 24A and each injection port 36 by branching off from the groove 20. The injection conduit 34 extends away from the face 18 in which is formed the groove 20, so that the reactant gas flowing in the injection conduit 34 is not in contact with the membrane electrode assembly pressed tight against this face 18.

Figure 3:
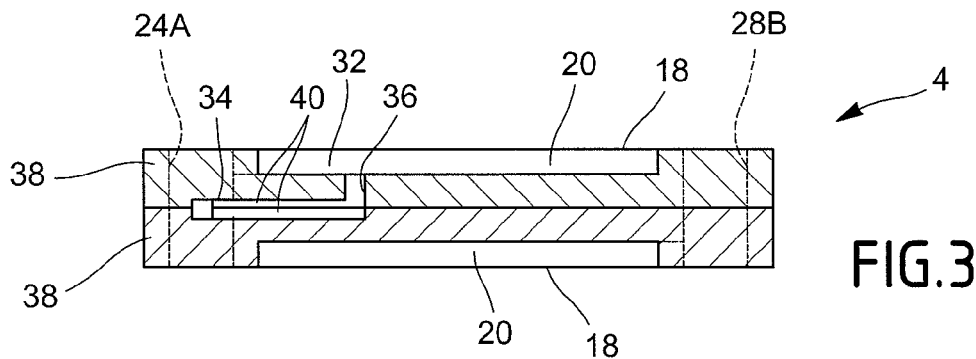

As seen in FIG. 3, the injection conduit 34 extends through the thickness of the separator plate 4. Each injection port 36 is formed by a hole extending between the bottom of the groove 20 and the injection conduit 34.

The separator plate 6 is a "biplate": the separator plate 6 is formed by the stacking of two elementary plates 38 pressed tight against one another. The injection conduit 34 is defined between the elementary plates 38. The injection conduit 34 is formed by channels 40 provided in the surfaces facing the elementary plates 38. As illustrated, the channels 40 are formed correspondingly arranged in the surfaces of the two elementary plates facing each other. Alternatively, the channels 40 are formed in only one of the elementary plates 38.

In the stack of the fuel cell, one face 18 of the separator plate 4 visible in FIG. 2 is in contact with a cathode side membrane electrode assembly.

During operation, the groove 20 of the face 18 is supplied with oxygen or air from the supply orifice 24A. Protons penetrate into this groove 20 by passing through the membrane electrode assembly. These protons combine with electrons supplied by the cathode and with the oxygen and thereby produce water.

The gases flowing in the groove 20 from the inlet section 22 to the outlet section 26 gradually undergo progressive depletion of the reactant gas and progressively take on more water along the path of the groove 20. The result thereof is, on the one hand, that the reactant gas supply decreases along the groove 20, and, on the other hand, that the moisture and risk of the formation of a water clog in the groove 20 increases.

The injection means 30 enable the injection of additional gas into one or more intermediate sections 32 of the groove 20 along the groove 20. This additional gas increases the flow rate of gas, thus facilitating the removal of moisture and reduces the risk of formation of a water clog.

Furthermore, this gas being the reactant gas, it replenishes the stream with reactant gas downstream of each injection port 36, which compensates for the consumption of reactant gases upstream of each injection port 36 and improves the performance of the fuel cell.

Depending on the shape of the groove, it is possible to determine the intermediate sections of the groove within which, or downstream from which the risk of formation of liquid clogs is the highest. The injection means are arranged in order for injection of gas in the intermediate sections.

Figure 4:
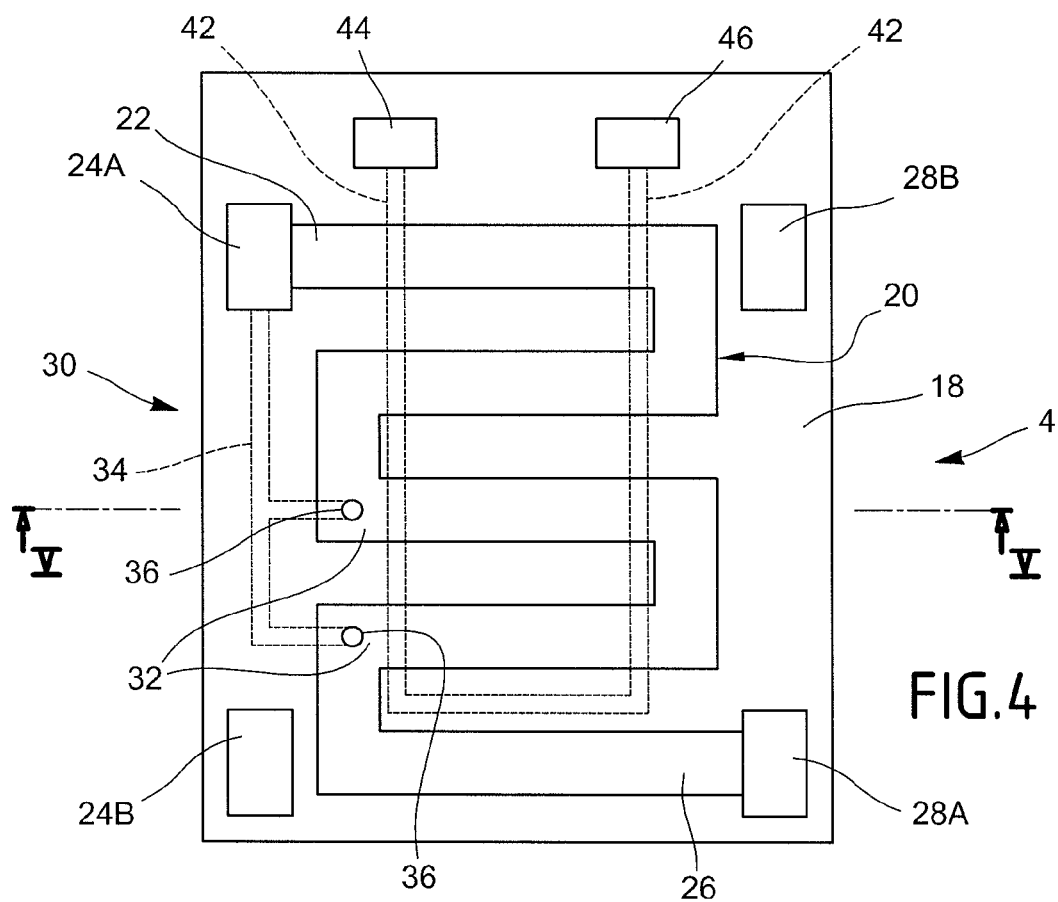
FIGS. 4 and 5 are views of a separator plate according to a variant, respectively from above and in section along V-V in FIG. 4.
Figure 5:
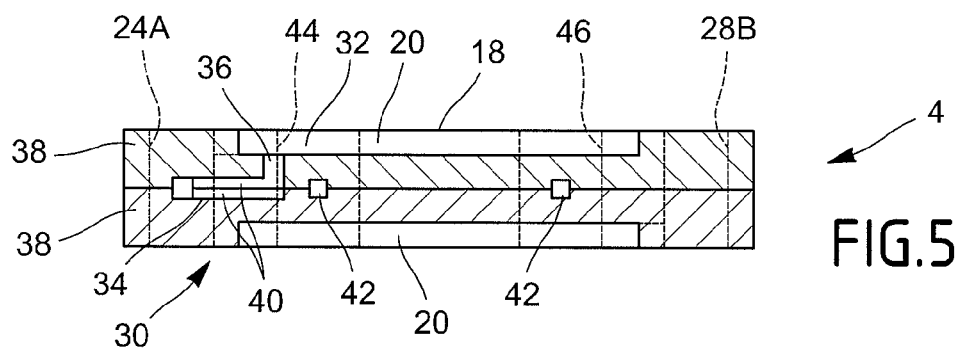

The separator plate 4 in FIGS. 4 and 5 differs from that in FIGS. 2 and 3 in that it further comprises the cooling means for carrying out the function of cooling the fuel cell 2.

The cooling means comprise cooling conduits 42 in the interior of the separator plate 6, formed between the elementary plates 38, for the circulation of a cooling fluid. The cooling conduits 42 are supplied with cooling fluid by means of a cooling inlet orifice 44 and open into a cooling outlet orifice 46 passing through the separator plate 4. When the separator plates 4 are stacked, the cooling inlet orifices 44 and the cooling outlet orifices 46 are aligned and respectively define a cooling inlet manifold and a cooling outlet manifold.

For reasons of clarity, only a single groove having a simple path and the associated injection means have been shown in FIGS. 2 to 5. Quite obviously, a separator plate may comprise a plurality of grooves supplied in parallel, with different paths, for example in a zigzag or spiral, and the means for injection of gas in a part or the entirety of the grooves.

The invention is not limited to bipolar separator plates but also relates to the monopolar separator plates and in a general manner to separator plates.

The invention is also applicable to proton exchange membrane fuel cells (PEMFC) and more generally to ion exchange membrane fuel cells. It is applicable in particular to fuel cells of SOFC type ("Solid Oxide Fuel Cell").

What is claimed is:

1. A fuel cell separator plate comprising:
at least one groove formed in a face of the separator plate in order to feed reactant gas to a membrane electrode assembly applied against the face of the separator plate, the groove comprising an inlet section and an outlet section; and
an injector configured so as to inject gas into at least one intermediate section of the groove, the injector being situated between the inlet section and the outlet section, the injector including at least one injection conduit extending through the separator plate, the injection conduit being supplied with reactant gas and opening into the intermediate section through an injection port, the injection conduit extending into the thickness of the separator plate, the injection conduit being delimited between two stacked elementary plates forming the separator plate.

2. The separator plate as recited in claim 1 wherein the injector is configured so as to inject reactant gas.

3. The separator plate as recited in claim 2 wherein the injector is supplied with reactant gas in a reactant gas supply orifice wherein the inlet section of the groove is fed.

4. The separator plate as recited in claim 1 wherein the injection conduit extends by branching off from the groove between a reactant gas supply orifice in which the inlet section of the groove is supplied, and at least one injection port.

5. The separator plate as recited in claim 1 further comprising cooling conduits extending in the interior of the separator plate.

6. The separator plate as recited in claim 1 wherein the separator plate is monopolar or bipolar.

7. A fuel cell comprising:
separator plates and membrane-electrode assemblies stacked in alternation, the separator plates including at least one of the separator plate as recited in claim 1.

8. A method for feeding a fuel cell, comprising:
feeding a groove formed in one face of a separator plate with a reactant gas in order to ensure the circulation of the reactant gas in contact with a membrane electrode applied against the face of the separator plate from an inlet section of the groove; and
injecting, by an injector, additional gas into at least one intermediate section of the groove, the intermediate section being situated between the inlet section and an outlet section of the groove, the injector being situated between the inlet section and the outlet section, the injector including at least one injection conduit extending through the separator plate, the injection conduit being supplied with reactant gas and opening into the intermediate section through an injection port, the injection conduit extending into the thickness of the separator plate, the injection conduit being delimited between two stacked elementary plates forming the separator plate.

* * * * *